(12) United States Patent
Heaysman et al.

(10) Patent No.: US 12,162,600 B2
(45) Date of Patent: Dec. 10, 2024

(54) AIRCRAFT PANEL ASSEMBLY

(71) Applicants: AIRBUS OPERATIONS LIMITED, Bristol (GB); AIRBUS OPERATIONS GmbH, Hamburg (DE)

(72) Inventors: Chris Heaysman, Bristol (GB); John Martin Gaitonde, Bristol (GB); Hauke Seegel, Hamburg (DE)

(73) Assignees: AIRBUS OPERATIONS LIMITED, Bristol (GB); AIRBUS OPERATIONS GmbH, Hamburg (DE)

( * ) Notice: Subject to any disclaimer, the term of this patent is extended or adjusted under 35 U.S.C. 154(b) by 336 days.

(21) Appl. No.: 17/298,501

(22) PCT Filed: May 13, 2020

(86) PCT No.: PCT/EP2020/063249
§ 371 (c)(1),
(2) Date: May 28, 2021

(87) PCT Pub. No.: WO2020/229501
PCT Pub. Date: Nov. 19, 2020

(65) Prior Publication Data
US 2022/0024556 A1 Jan. 27, 2022

(30) Foreign Application Priority Data

May 14, 2019 (GB) ...................................... 1906794
May 14, 2019 (GB) ...................................... 1906796

(51) Int. Cl.
*B64C 3/18* (2006.01)
*B64C 1/00* (2006.01)
(Continued)

(52) U.S. Cl.
CPC ................ *B64C 3/182* (2013.01); *B64C 1/00* (2013.01); *B64C 1/06* (2013.01); *B64C 1/061* (2013.01);
(Continued)

(58) Field of Classification Search
CPC ......... B64C 3/182; B64C 3/185; B64C 3/187; B64C 3/26
See application file for complete search history.

(56) References Cited

U.S. PATENT DOCUMENTS 5,192,387 A    3/1993  Buckley
6,114,012 A *  9/2000  Amaoka ............ B29D 99/0007
                                                    244/119
(Continued)

FOREIGN PATENT DOCUMENTS

DE          37 39 753    6/1989
DE    10 2008 057 247    1/2010
(Continued)

OTHER PUBLICATIONS

Combined Search and Examination Report for GB Application No. 1906794.1 dated Nov. 7, 2019, 9 pages.
(Continued)

*Primary Examiner* — Michael H Wang
(74) *Attorney, Agent, or Firm* — Nixon & Vanderhye P.C.

(57) ABSTRACT

An aircraft panel assembly with a panel and a plurality of stiffeners on the panel is disclosed. Each stiffener has an attachment part attached to the panel and a structural part spaced apart from the panel. A rib foot beam crosses the stiffeners at a series of intersections. At each intersection the rib foot beam is located between the panel and the structural part of a respective one of the stiffeners.

14 Claims, 13 Drawing Sheets

(51) Int. Cl.
*B64C 1/06* (2006.01)
*B64C 3/20* (2006.01)
*B64C 3/26* (2006.01)
*B64C 3/34* (2006.01)
*B64F 5/10* (2017.01)
*B29C 70/42* (2006.01)
*B29C 70/84* (2006.01)
*B29D 99/00* (2010.01)

(52) U.S. Cl.
CPC .............. *B64C 1/064* (2013.01); *B64C 1/065* (2013.01); *B64C 3/187* (2013.01); *B64C 3/20* (2013.01); *B64C 3/26* (2013.01); *B64C 3/34* (2013.01); *B64F 5/10* (2017.01); *B29C 70/42* (2013.01); *B29C 70/84* (2013.01); *B29D 99/0014* (2013.01)

(56) References Cited

U.S. PATENT DOCUMENTS

| | | | | |
|---|---|---|---|---|
| 6,702,911 | B2* | 3/2004 | Toi | B64C 1/12 264/258 |
| 6,766,984 | B1* | 7/2004 | Ochoa | B64C 1/12 244/119 |
| 6,817,574 | B2* | 11/2004 | Solanille | B64C 1/1461 244/129.5 |
| 7,134,629 | B2* | 11/2006 | Johnson | B63B 3/28 244/119 |
| 7,159,822 | B2* | 1/2007 | Grantham | B64C 3/182 244/119 |
| 7,527,222 | B2* | 5/2009 | Biornstad | B29C 70/44 244/119 |
| 8,096,504 | B2* | 1/2012 | Arevalo | B64C 1/064 244/119 |
| 8,636,252 | B2* | 1/2014 | Pook | B29C 65/5057 244/119 |
| 8,726,614 | B2* | 5/2014 | Donnellan | E02D 29/1472 52/799.13 |
| 9,694,895 | B2* | 7/2017 | Senibi | B32B 3/28 |
| 9,765,512 | B2* | 9/2017 | Williams | F01D 5/147 |
| 10,308,345 | B2* | 6/2019 | Marks | B64C 3/182 |
| 2005/0266203 | A1 | 12/2005 | La Forest et al. | |
| 2006/0208135 | A1 | 9/2006 | Liguore et al. | |
| 2009/0057487 | A1* | 3/2009 | Velicki | B29C 70/443 428/221 |
| 2009/0127393 | A1 | 5/2009 | Guzman et al. | |
| 2010/0007064 | A1 | 1/2010 | Ashton | |
| 2012/0118487 | A1 | 5/2012 | Havens et al. | |
| 2012/0219764 | A1 | 8/2012 | Biornstad et al. | |
| 2013/0240130 | A1 | 9/2013 | Funnell | |
| 2014/0154458 | A1 | 6/2014 | Zilberman et al. | |
| 2015/0273736 | A1 | 10/2015 | Schneider et al. | |
| 2016/0101543 | A1 | 4/2016 | Fisher, Jr. et al. | |
| 2016/0339682 | A1 | 11/2016 | Bahe et al. | |
| 2017/0174313 | A1 | 6/2017 | Brakes | |

FOREIGN PATENT DOCUMENTS

| | | |
|---|---|---|
| EP | 0 995 673 | 4/2000 |
| EP | 2 626 291 | 8/2013 |
| EP | 2 989 002 A1 | 3/2016 |
| EP | 1 749 631 B1 | 2/2018 |
| EP | 2 989 002 B1 | 3/2019 |
| EP | 3 501 804 | 6/2019 |
| FR | 2 914 219 | 10/2008 |
| GB | 2292332 | 2/1996 |
| GB | 2 344 807 A | 6/2000 |
| GB | 2542662 | 3/2017 |
| WO | 2005030462 A2 | 4/2005 |
| WO | 2014/175795 | 10/2014 |
| WO | 2015/015152 | 2/2015 |
| WO | 2015/158865 | 10/2015 |
| WO | 2017112012 A2 | 6/2017 |

OTHER PUBLICATIONS

Combined Search and Examination Report for GB Application No. 1906796.6 dated Nov. 7, 2019, 7 pages.
International Search Report and Written Opinion of the ISA for PCT/EP2020/063249 dated Oct. 27, 2020, 23 pages.
Further Search Report for Application No. GB 1906794.1, two pages, dated May 13, 2020.
Partial European Search Report for Application No. EP 23196669.8, 15 pages, dated Oct. 2, 2023.

* cited by examiner

E - E

AIRCRAFT PANEL ASSEMBLY

CROSS REFERENCE TO RELATED APPLICATIONS

The present application is a National Phase of International Application Number PCT/EP2020/063249 filed May 13, 2020, which designated the U.S. and claims priority benefits from Great Britain Applications Number GB 1906794.1 filed May 14, 2019, and GB 1906796.6 filed May 14, 2019 the entire contents of each of which are hereby incorporated by reference.

FIELD OF THE INVENTION

The present invention relates to an aircraft panel assembly, and a method of manufacturing an aircraft panel assembly.

BACKGROUND OF THE INVENTION

EP0995673 discloses in FIG. 12 a shell construction for an aircraft with stringer webs and ribs which form a grid.

WO2015/015152 discloses in FIG. 14 an aircraft structure with rib feet which span the gap between adjacent stringers.

SUMMARY OF THE INVENTION

According to a first aspect of the invention, there is provided an aircraft panel assembly comprising: a panel; and a plurality of stiffeners on the panel, wherein each stiffener comprises an attachment part attached to the panel and a structural part spaced apart from the panel; and a rib foot beam which crosses the stiffeners at a series of intersections, wherein at each intersection the rib foot beam is located between the panel and the structural part of a respective one of the stiffeners.

The aircraft panel assembly has a number of advantages compared with the structure of WO2015/015152. Firstly, the use of a single rib foot beam rather than a plurality of rib feet makes the assembly less complex to manufacture. Secondly, the use of a single rib foot beam means that it is not necessary to align multiple rib feet with each other. Thirdly, positioning the rib foot beam between the panel and the structural parts of the stiffeners provides improved stress performance because the rib foot beam is held down on the panel by the structural parts of the stiffeners.

Preferably the panel, the rib foot beam and/or the structural parts of the stiffeners comprise fibre-reinforced composite material, such as carbon fibre-reinforced epoxy resin. Alternatively the panel, the rib foot beam and/or the structural parts of the stiffeners may be metal.

The assembly may comprise a layer (typically a layer of fibre-reinforced composite material) which forms the structural parts all of the stiffeners. Optionally the layer forms the structural parts all of the stiffeners and also covers the rib foot beam between the stiffeners.

Further optional features of aircraft panel assemblies according to the first aspect of the invention are set out in claims 2 to 10.

A further aspect of the invention provides an aircraft fuel tank comprising a panel assembly according to the first aspect. The aircraft fuel tank may be a wing tank, a centre tank, or any other fuel tank of an aircraft.

The aircraft panel assembly of the first aspect is particularly well suited to use in an aircraft fuel tank, because the structural parts of the stiffeners can hold the rib foot beam down against the panel and prevent fuel pressure forces from detaching the rib foot beam from the panel.

A further aspect of the invention provides an aircraft wing comprising an upper wing cover assembly; a lower wing cover assembly; and a rib connecting the upper wing cover assembly to the lower wing cover assembly; wherein at least one of the wing cover assemblies comprises a panel assembly according to the first aspect with its rib foot beam attached to the rib between the intersections.

A further aspect of the invention provides an aircraft wing comprising an upper cover; a lower cover; ribs connecting the upper cover to the lower cover; and a plurality of stiffeners attached to the upper and lower covers, wherein each rib is joined to each cover by a respective rib/cover connection arrangement, at least one of the rib/cover connection arrangements comprises a rib foot beam which crosses the stiffeners at a series of intersections and is attached to a respective one of the ribs between the intersections, and at each intersection the rib foot beam is located between the cover and at least part of a respective one of the stiffeners.

Optionally the wing further comprises a fuel tank between the upper and lower covers.

A further aspect of the invention provides a method of manufacturing an aircraft panel assembly, the panel assembly comprising a panel; a plurality of stiffeners; and a rib foot beam, the method comprising: providing a fibre preform on a forming tool, wherein the fibre preform comprises a plurality of stiffener preforms; laying the rib foot beam across the stiffener preforms so that it crosses the stiffener preforms at a series of intersections; laying a panel preform over the fibre preform and the rib foot beam so that at each intersection the rib foot beam is located between the panel preform and a structural part of a respective one of the stiffener preforms; co-infusing the panel preform and the fibre preform with a matrix material; and curing the matrix material.

A further aspect of the invention provides a method of manufacturing an aircraft panel assembly, the panel assembly comprising a panel and a plurality of stiffeners, the method comprising: providing a fibre preform on a forming tool by cutting fibres to form cut fibres and spraying the cut fibres onto the forming tool, wherein the fibre preform comprises a plurality of stiffener preforms; laying a panel preform over the fibre preform; co-infusing the panel preform and the fibre preform with a matrix material; and curing the matrix material. The cut fibres may be cut rovings (bundles of fibres), individual fibres, or cut fibres in any other form. The panel assembly may be provided with a rib foot beam as in the previous aspect, or it may have no rib foot beam.

A further aspect of the invention provides a stiffened panel assembly comprising: a panel; and a stiffener on the panel, the stiffener comprising: a structural part, a core in the structural part, a longitudinal channel in the core which extends in a length direction of the core, and a bladder in the longitudinal channel.

The bladder may be in an inflated state or a deflated state. Further optional features of stiffened panel assemblies according to this aspect of the invention are set out in clauses 2 to 12 of the numbered clauses provided at the end of the detailed description.

According to a further aspect of the invention, there is provided an aircraft or aircraft part (such as an aircraft wing, an aircraft wing cover panel or an aircraft fuselage panel) comprising a stiffened panel assembly according to the further aspect.

According to a further aspect of the invention, there is provided a method of manufacturing a stiffened panel assembly according to the first aspect, the method comprising: injecting matrix material into the longitudinal channel so that a first portion of the matrix material flows along the longitudinal channel and then flows from the longitudinal channel into the structural part and into the panel, and a second portion of the matrix material remains in the longitudinal channel and in contact with the bladder; inflating the bladder (optionally with a gas) so that the bladder forces at least some of the second portion of the matrix material to flow out of the longitudinal channel; and curing the matrix material so that the stiffener becomes bonded to the panel.

Further optional features of methods according to this aspect of the invention are set out in clauses 15 to 20 of the numbered clauses provided at the end of the detailed description.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
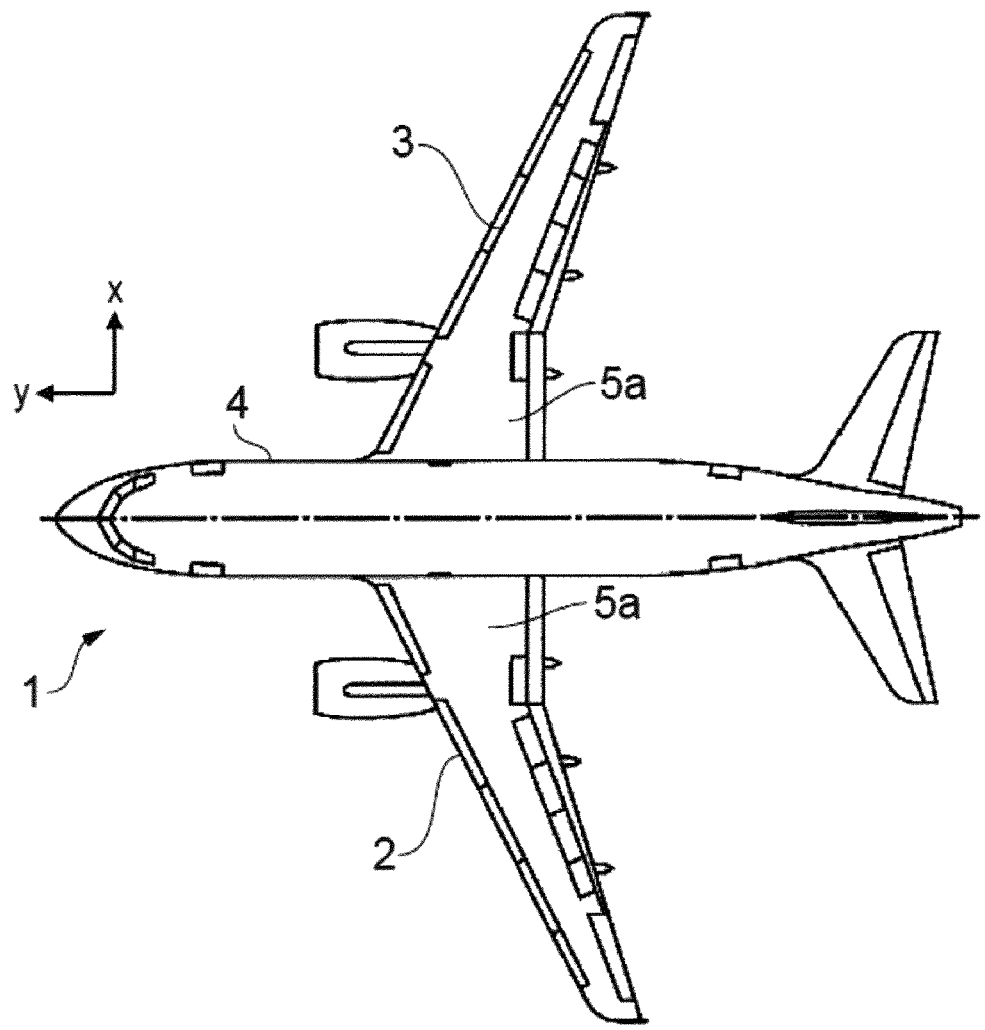
FIG. 1 shows an aircraft.

FIG. 1 shows an aircraft 1 with port and starboard wings 2, 3. Each wing has a cantilevered structure with a length extending in a spanwise direction from a root to a tip, the root being joined to an aircraft fuselage 4. The wings 2, 3 are similar in construction so only the starboard wing 3 will be described in detail with reference to FIGS. 2 and 3.

Figure 2:
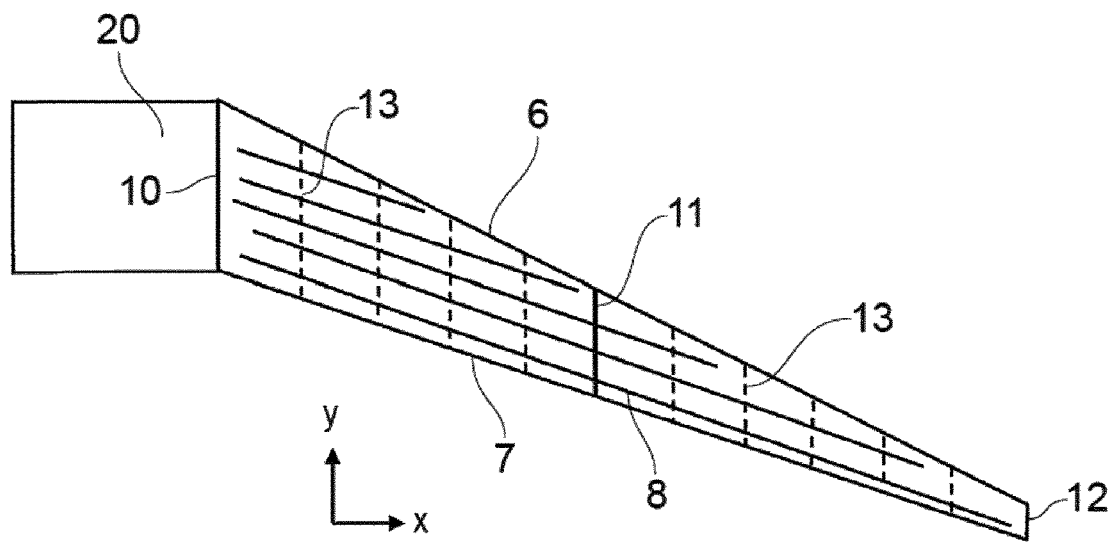
FIG. 2 is a schematic view of the wing box of one of the wings.
Figure 3:
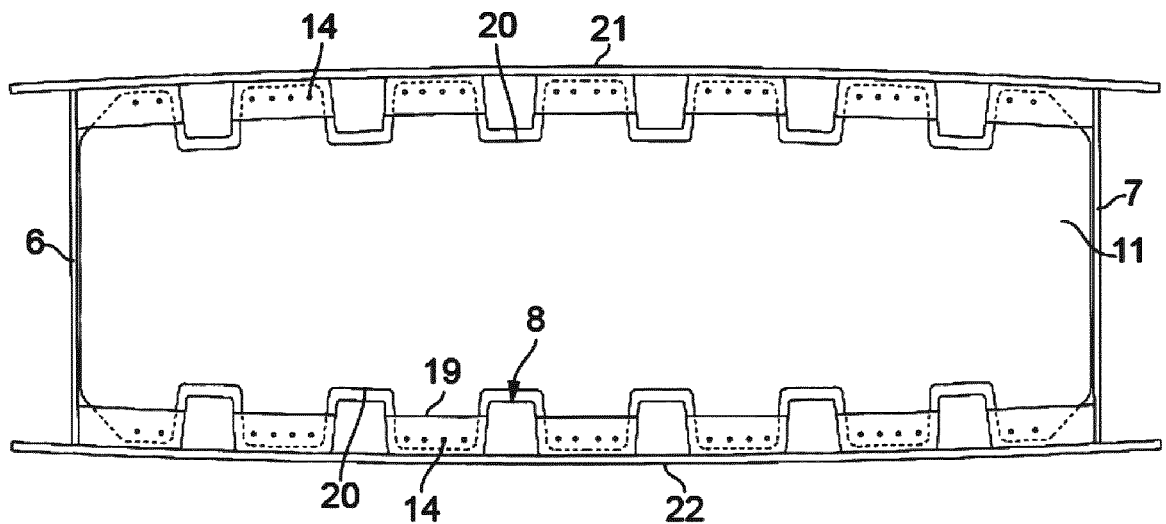
FIG. 3 shows the rib/cover connection arrangements for one of the ribs.

The main structural element of the wing is a wing box formed by upper and lower cover panels 21, 22 and front and rear spars 6, 7 shown in cross-section in FIG. 3. The cover panels 21, 22 and spars 6, 7 are each Carbon Fibre Reinforced Polymer (CFRP) laminate components. Each cover panel has a curved aerodynamic surface (the upper surface of the upper cover panel 21 and the lower surface of the lower cover panel 22) over which air flows during flight of the aircraft. Each cover panel also has an inner surface carrying a series of stiffeners 8 extending in the spanwise direction. Each cover panel carries a large number of stiffeners 8, only five of which are shown in FIG. 2 and only six of which are shown in FIG. 3 for purposes of clarity. Each stiffener 8 is joined to one cover panel but not the other. In the case of an aircraft wing cover panel, the stiffeners 8 are commonly referred to as stringers, but the term "stiffeners" will be used below.

The wing box also has a plurality of transverse ribs, each rib being joined to the covers 21, 22 and the spars 6, 7. The ribs include an inner-most inboard rib 10 located at the root of the wing box, and a number of further ribs spaced apart from the inner-most rib along the length of the wing box. The wing box is divided into two fuel tanks: an inboard wing fuel tank bounded by the inboard rib 10, a mid-span rib 11, the cover panels 21, 22 and the spars 6, 7; and an outboard wing fuel tank bounded by the mid-span rib 11, an outboard rib 12 at the tip of the wing box, the cover panels 21, 22 and the spars 6, 7.

The inboard rib 10 is an attachment rib which forms the root of the wing box and is joined to a centre wing box 20 within the body of the fuselage 4. Baffle ribs 13 (shown in dashed lines) form internal baffles within the fuel tanks which divide the fuel tanks into bays. The ribs 10, 11, 12 are sealed to prevent the flow of fuel out of the two fuel tanks, but the baffle ribs 13 are not sealed so that fuel can flow across them between the bays. As can be seen in FIG. 2, the stiffeners 8 stop short of the inboard rib 10 and the outboard rib 12, but pass through the baffle ribs 13 and the mid-span rib 11.

Figure 4:
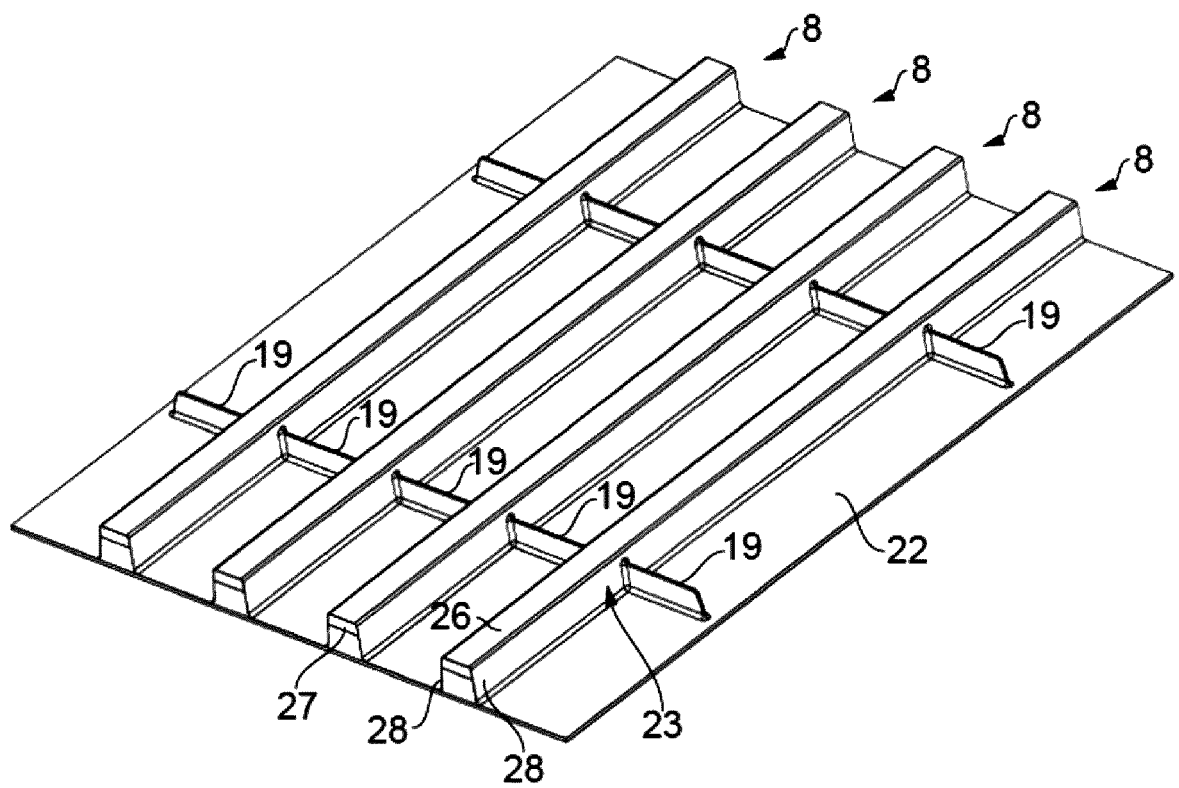
FIG. 4 shows an aircraft panel assembly according to a first embodiment of the invention.
Figure 5:
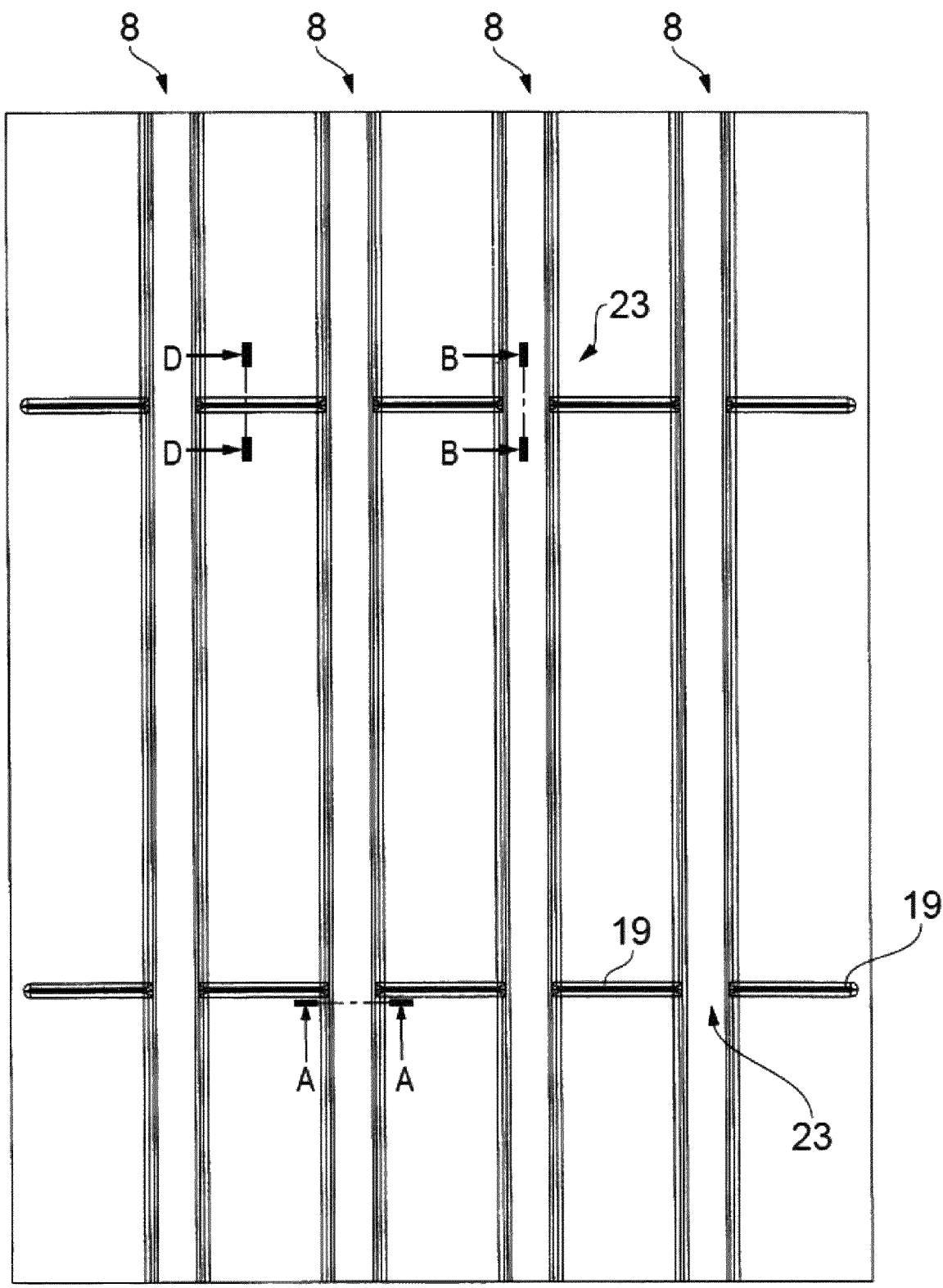
FIG. 5 is a plan view of the assembly of FIG. 4.
Figure 6:
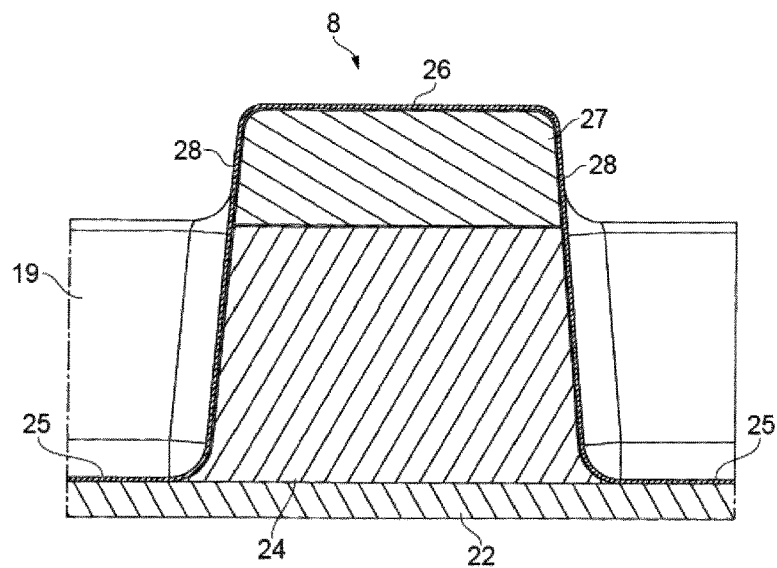
FIG. 6 is a cross-section across one of the stiffeners taken along line A-A in FIG. 5.

FIG. 4 shows a panel assembly which includes the cover 22; and four of the stiffeners 8 carried on the inner surface of the cover 22. As shown most clearly in FIG. 6, each stiffener 8 comprises a pair of feet 25; a pair of webs 28; and a crown 26 which joins the pair of webs 28 to each other. The feet 25, the webs 28 and the crown 26 together form a top-hat shaped profile in cross-section. Alternatively, example each stiffener may have an omega-shaped profile. Alternatively each stiffener may have a different profile such as T-shaped profile, an I-shaped profile, a top heavy I-shaped profile, a baseball bat profile, a lollipop profile or a blade-shaped profile.

The feet 25 are directly bonded to the inner surface of the lower cover panel 22 by a co-infused joint, and the crown 26 is spaced apart from the lower cover panel 22 at an apex of the stiffener. Each stiffener also has a foam core 24 positioned between the webs 28 at the base of the stiffener and carried by the lower cover panel 22; and a batten 27 positioned between the webs 28 and in contact with the crown 26 at the apex of the stiffener. The batten 27 is made of fibre-reinforced composite material, such as carbon fibre-reinforced epoxy resin.

The crown 26 and batten 27 provide structural parts of the stiffener, spaced well away from the neutral bending axis at the apex of the stringer to enhance its bending stiffness. The core 24 acts as a filler, and as a support for the batten 27.

Figure 8:
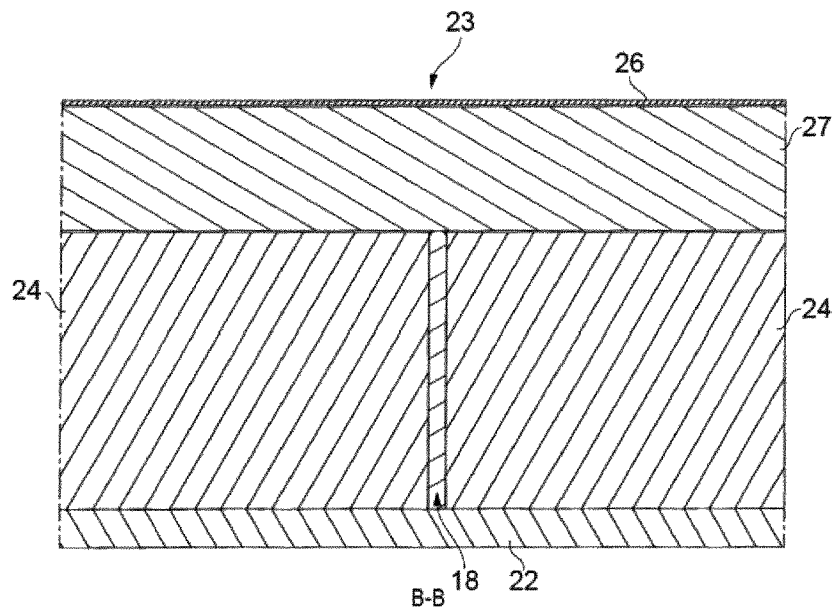
FIG. 8 is a cross-section along one of the stiffeners at an intersection, taken along line B-B in FIG. 6.

A rib foot beam 18 crosses the stiffeners at a series of intersections 23, one of which is shown in cross-section in FIG. 8. The foam core 24 is formed in segments, and at the intersection 23 the rib foot beam 18 passes through slots in the webs 28 and through the gap between the two adjacent segments of the foam core 24 as shown in FIG. 8. As also shown in FIG. 8, at each intersection 23 the rib foot beam 18 is located between the lower cover panel 22 and the structural parts (i.e. the crown 26 and batten 27) of a respective one of the stiffeners 8.

At each intersection 23 the structural parts 26, 27 of the respective one of the stiffeners extend continuously across the intersection, unlike the foam core 24 which is broken into segments as shown in FIG. 8 and the webs 28 which are formed with slots to allow passage of the rib foot beam 18. This continuity of the structural parts 26, 27 is advantageous because it enhances the bending stiffness of the stiffener, and enables carbon fibres in the structural parts 26, 27 to extend continuously across the intersection 23.

The bottom edge of the rib foot beam 18 is bonded to the lower cover panel 22 panel by a co-bonded joint, and at each intersection 23 the rib foot beam 18 is also co-bonded to the end faces of the foam core segments 24 and the batten 27 as shown in FIG. 8.

Figure 7:
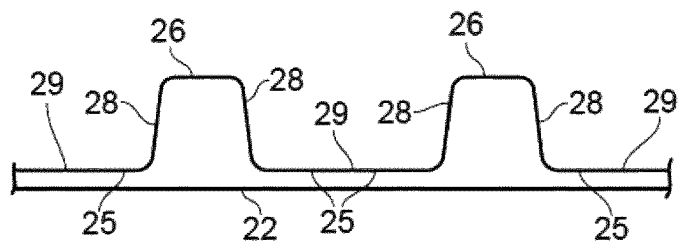
FIG. 7 is a schematic view of two adjacent stringers.
Figure 9:
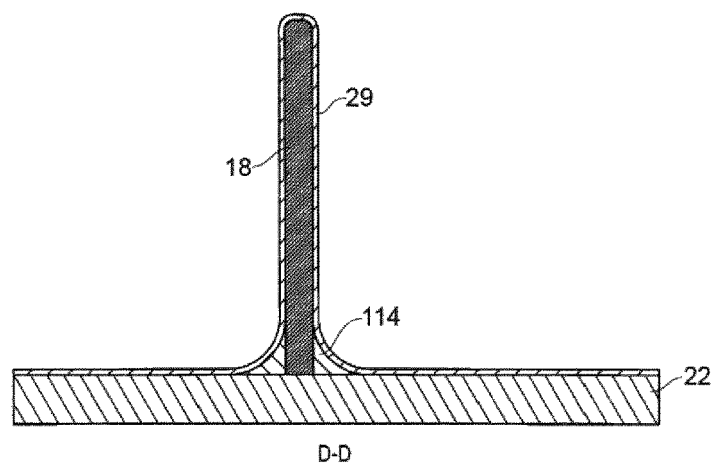
FIG. 9 is a cross-section across one of the rib feet, taken along line D-D in FIG. 5.

The feet 25, webs 28 and crowns 26 of all of the stiffeners are formed from a single layer 29 of fibre-reinforced epoxy resin, so that the feet 25 run continuously between adjacent stiffeners as shown in FIG. 7 rather than terminating at distinct edges between the adjacent stiffeners. The layer 29 also covers the rib foot beam 18 as shown in FIG. 9 to form a rib foot 19 between each pair of stiffeners as shown in FIG. 4.

Each rib 10, 11 13 connects the upper cover 21 to the lower cover 22, and FIG. 3 shows the upper and lower rib/cover connection arrangements for the rib 11 by way of example. The rib feet 19 (including the rib foot beam 18) are attached to the rib 11 between the stiffeners by fasteners 14 which pass through the rib 11 and the rib feet 19. The stiffeners 8 pass through mouse-hole openings 20 in the rib 11.

As noted above, the upper and lower cover panels 21, 22 provide the upper and lower walls respectively of a fuel tank. If the fuel tank is over-filled, then large fuel pressure forces can be generated which risk detaching the rib feet 19 from the cover panel. The interlocking rib foot/stringer arrangement enables the structural parts 26, 27 of the stiffeners to hold the rib foot beam 18 down against the cover panel and prevent fuel pressure forces from separating the rib foot beam 18 from the cover panel.

The use of a single rib foot beam 18 makes the assembly less complex to manufacture. It is also not necessary to align multiple rib feet with each other.

A first method of manufacturing an aircraft panel assembly is shown in FIGS. 10-20. The panel assembly is similar to the panel assembly of FIG. 4, and the same reference numbers will be used to indicate equivalent components. The method involves the use of various dry-fibre preforms which become infused with epoxy resin to form a composite component in the final part. Such preforms are given the same reference numbers as the component they form in the final infused part, appended by the letter "a". So for example the fibre preform 29a becomes the layer 29 in the final infused part.

Figure 10:
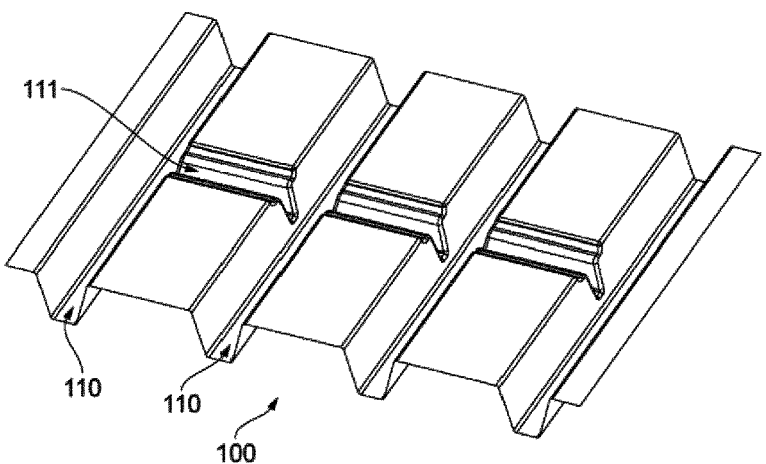
FIG. 10 shows a female forming tool.
Figure 11:
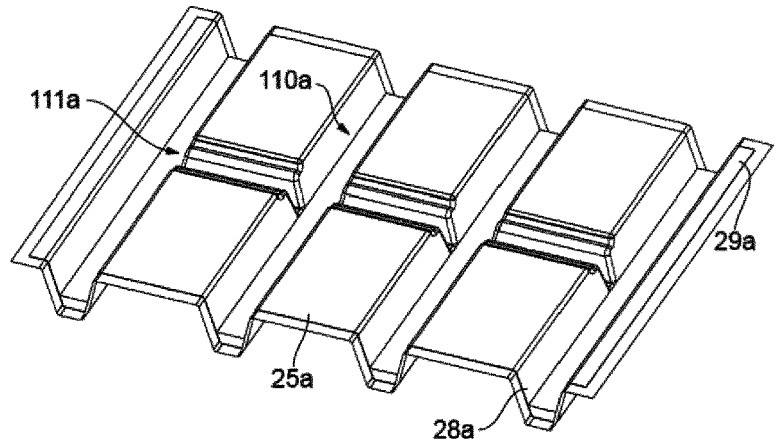
FIG. 11 shows a fibre preform on the female forming tool of FIG. 10.

A female forming tool 100 shown in FIG. 10 has a criss-crossing arrangement of rib foot tool grooves 111 and stiffener tool grooves 110. A fibre preform 29a is first provided on the tool as shown in FIG. 11. The fibre preform 29a is made of a dry carbon fibre material which may be provided on the forming tool 100 in a number of different ways dependent on the requirements of the part, such as the required fibre volume or the load carrying areas of the part.

In one example the fibre preform 29a may be provided on the forming tool 100 by press-forming a carbon fibre veil, a fleece, a long fibre carpet, or a stretch-breaking fabric, which is then stabilised using a binder. The binder is then activated by, for example, heat applied by hot air, friction or some other method. The veil, fleece, carpet or fabric may be laid up as a single layer or as a patchwork of segments which collectively form a single layer.

Alternatively, the fibre preform 29a may be deposited using the method disclosed in US2015/0273736 A1, by spraying cut rovings onto the female forming tool 100. Reinforced fibre bundles (known as rovings) are pulled from a bobbin and cut to length in a deposition head. The cut rovings are sprayed onto the surface of the female forming tool 100 using the deposition head, which is preferably mounted on a robot to enable a repeatable result. The rovings may be equipped with a binder, or the binder may be applied in-situ to the cut rovings during the spraying process. The female forming tool 100 is preferably porous and under vacuum to pull the cut rovings to the surface of the tool 100 during the spraying process. This process provides a quasi-isotropic preform 29a with the fibres oriented randomly.

As shown in FIG. 11, the fibre preform 29a comprises stiffener preforms 110a in the stiffener tool grooves 110 and stiffener foot preforms 25a running continuously between the stiffener tool grooves 110. Each stiffener preform 110a comprises a pair of web portions 28a and a crown portion. The fibre preform 29a also comprises a rib foot preform 111a in the tool groove 111.

Figure 12:
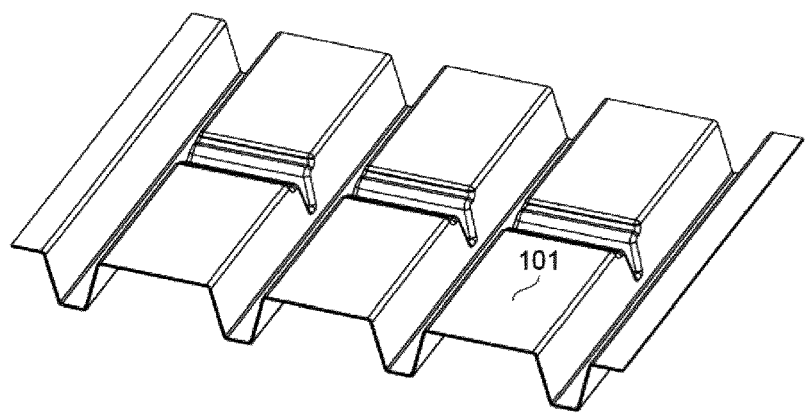
FIG. 12 shows a male compaction tool fitted with the fibre preform between the male compaction tool and the female forming tool.
Figure 13:
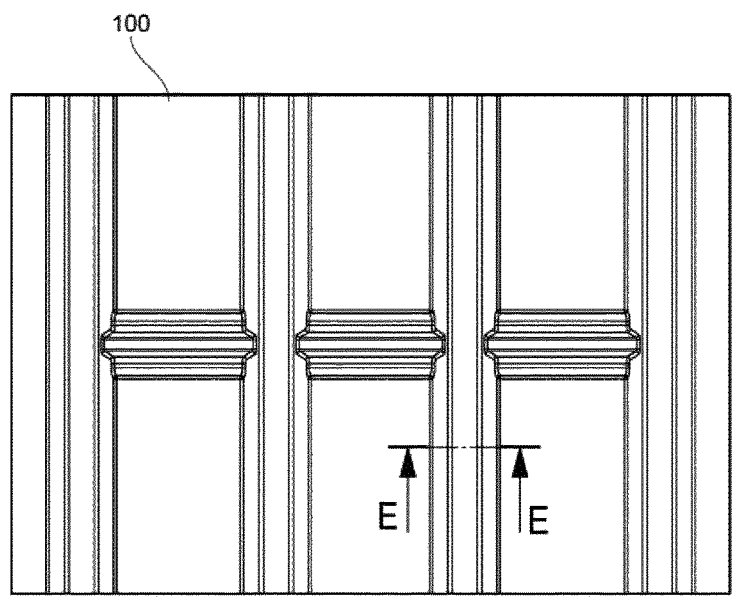
FIG. 13 is a plan view of the apparatus of FIG. 13.
Figure 14:
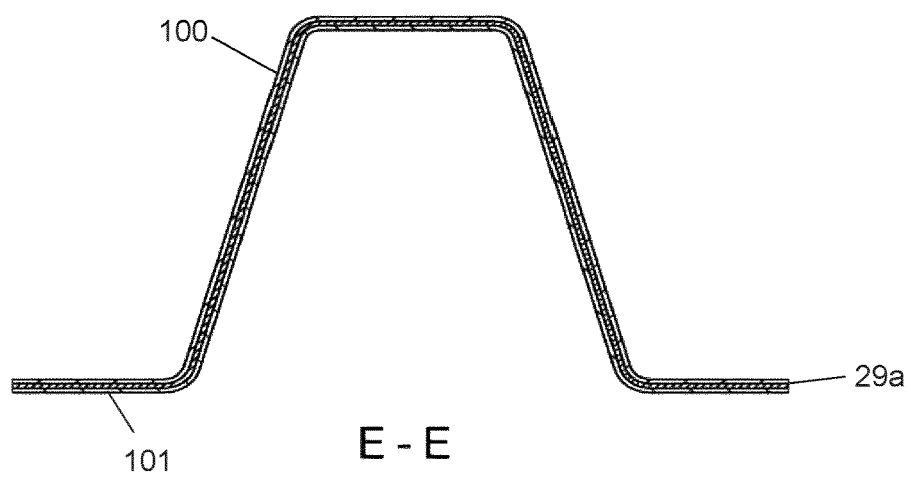
FIG. 14 a cross-section across one of the stiffener preforms taken along line E-E in FIG. 13.

Next, a male compaction tool 101 with complementary male ridges is fitted as shown in FIG. 12 to clamp the fibre preform 29a between the male and female tools 101, 100 as shown in FIG. 14. The fibre preform 29a is then compacted between the tools 101, 100 to de-bulk it and mould it into its desired shape.

Figure 15:
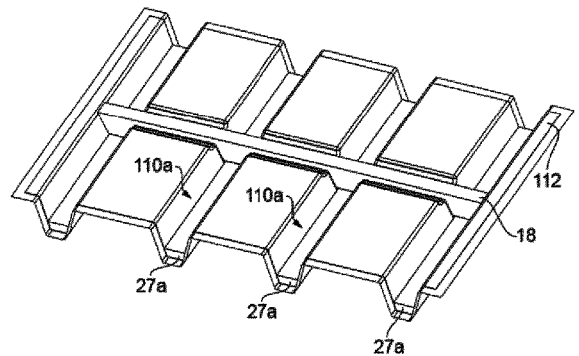
FIG. 15 shows a rib foot beam and batten preforms laid onto the fibre preform.

Next the male tool 101 is removed, and batten preforms 27a are laid in the stiffener preforms 110a as shown in FIG. 15. The batten preforms 27a are made of a dry carbon fibrous reinforcement material with continuous fibres running along their length. The continuous fibres may be deposited by automated fibre placement.

Next the rib foot beam 18 is laid in the rib foot preform 111a as shown in FIG. 11, across the batten preforms 27a. The rib foot beam 18 is fitted as a single cured piece of laminated prepreg composite material, and is in contact with the fibrous reinforcement material of the batten preforms 27a at each intersection.

Figure 16:
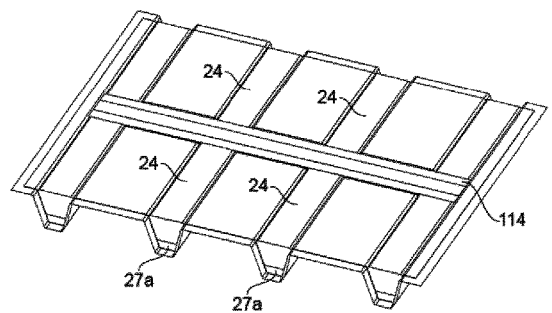
FIG. 16 shows form cores and additional material.

Next the foam core segments 24 are laid on top of the batten preforms 27a as shown in FIG. 16, and additional dry fibre noodles 114 (shown in FIG. 16) and 128 (shown in FIG. 20) are inserted to fill the gaps.

Figure 17:
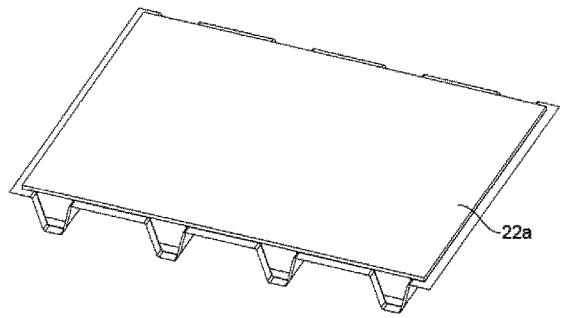
FIG. 17 shows a cover panel laid onto the other parts.
Figure 18:
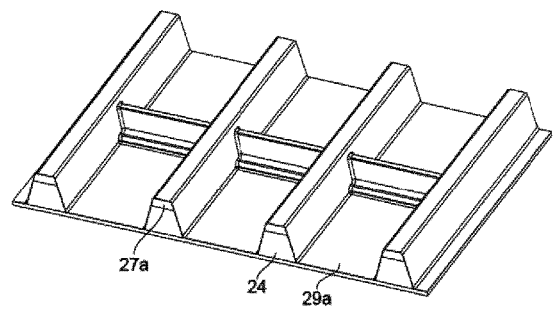
FIG. 18 shows the final preform assembly.
Figure 19:
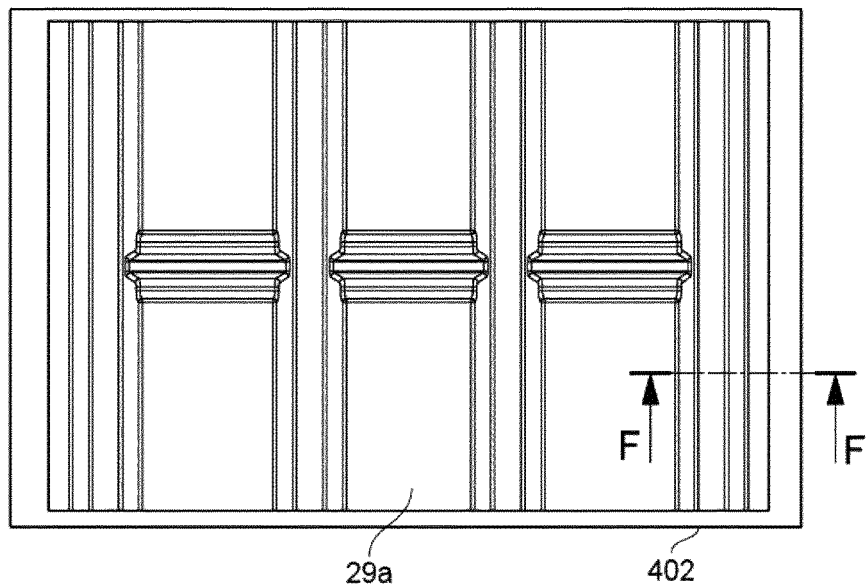
FIG. 19 is a plan view of the final preform assembly on an infusion tool.
Figure 20:
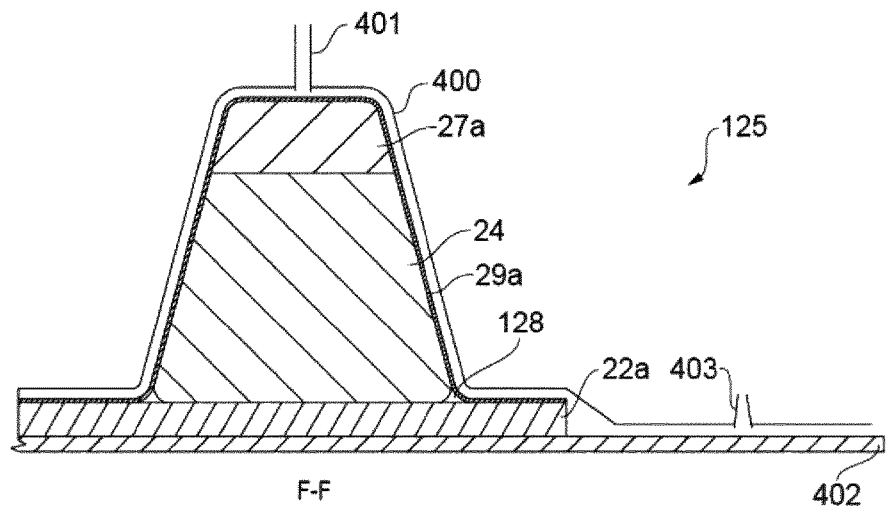
FIG. 20 a cross-section across one of the stiffener preforms taken along line F-F in FIG. 19.

Next a lower cover panel preform 22a is laid on top as shown in FIG. 17, in contact with the fibre preform 29a, the rib foot beam 18 and the noodles 114, 128. The assembly is then inverted and the female forming tool 100 is removed to leave the preform assembly shown in FIG. 18. The preform assembly is placed on an infusion tool 402 shown in FIGS. 19 and 20, and covered by a vacuum bag 400. A vacuum is then applied to a vacuum port 403 shown in FIG. 20, and epoxy resin is injected via an inlet 401. The resin co-infuses the dry fibre components of the preform assembly (the fibre preform 29a, the batten preforms 27a, the cover panel preform 22a and the noodles 114, 128) and the resin is then cured.

Co-infusing the preforms 29a, 27a, 22a and noodles 114, 128 with epoxy resin matrix material, and then curing the matrix material, forms various co-infused and co-bonded joints between the elements of the preform assembly.

In the example of FIGS. 10-20 the fibre preform 29a is formed on a female forming tool 100 and then compacted between the female forming tool 100 and a male compaction tool 101. In the alternative example shown in FIGS. 21-26, the opposite is the case: a fibre preform 229a is formed on a male forming tool 200 and then compacted between the male forming tool 200 and a female compaction tool 201. So in the case of FIGS. 10-20 the stiffener preforms are formed in grooves of the female forming tool 100, whereas in the case of FIG. 22 the stiffener preforms are formed on male features of the male forming tool 200.

The panel assembly formed by the method of FIGS. 21 to 26 is similar to the panel assembly previously described, and the same reference numbers will be used to indicate equivalent components, incremented by 200. The method involves the use of various dry-fibre preforms which become infused with epoxy resin to form a composite component in the final part. Such preforms are given the same reference numbers as the component they form in the final part, appended by the letter "a". So for example the fibre preform 229a becomes the layer 229 in the final part.

Figure 21:
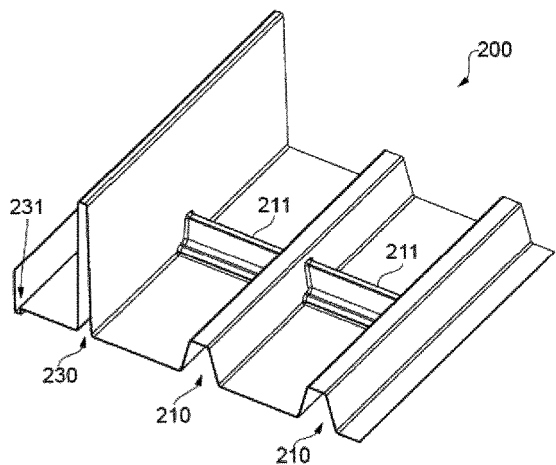
FIG. 21 shows a male forming tool.

The male forming tool 200 shown in FIG. 21 is provided with a criss-crossing arrangement of rib foot tool ridges 211 and stiffener tool ridges 210. The male forming tool also has a spar tool ridge 230 and a gutter 232 at one edge.

Figure 22:
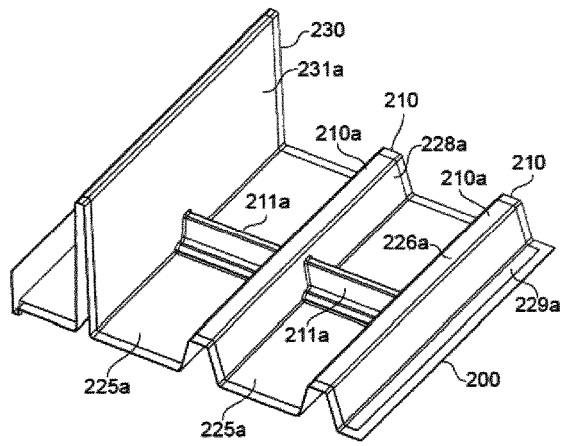
FIG. 22 shows a fibre preform on the male forming tool of FIG. 21.

A fibre preform 229a is formed on the male forming tool 200 as shown in FIG. 22. The fibre preform 229a is made of a dry carbon fibre material which may be provided on the male forming tool 200 by the same process that the fibre preform 29a is provided on the female forming tool 100, i.e. by press-forming or spraying.

As shown in FIG. 22, the fibre preform 229a comprises stiffener preforms 210a on the stiffener tool ridges 210, stiffener foot preforms 225a between the ridges 210a and a spar preform 231a on the spar tool ridge 230. Each stiffener preform 210a comprises a pair of web portions 228a and a crown portion 226a. The fibre preform 229a also comprises rib foot preforms 211a laid on the rib foot tool ridges 211.

Each stiffener foot preform 225a runs continuously between an adjacent pair of the stiffener preforms 210a; and each stiffener preform 210a comprises a pair of web preforms 228a and a crown preform 226a which joins the pair of web preforms to each other.

The spar preform 231a has a high aspect ratio (height/width) which would be difficult to form inside a groove of a female forming tool, so the male profile of the male forming tool 200 is preferred.

Figure 23:
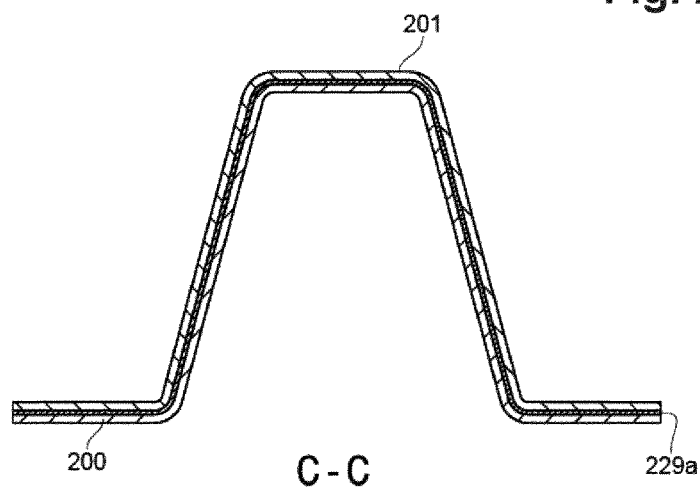
FIG. 23 is a cross-section across one of the stiffener preforms during compaction.

Next, a female compaction tool 201 with complementary female grooves is fitted to clamp the fibre preform 229a between the male and female tools as shown in FIG. 23. The fibre preform 229a is then compacted between the tools to de-bulk it and mould it into its desired shape.

Figure 24:
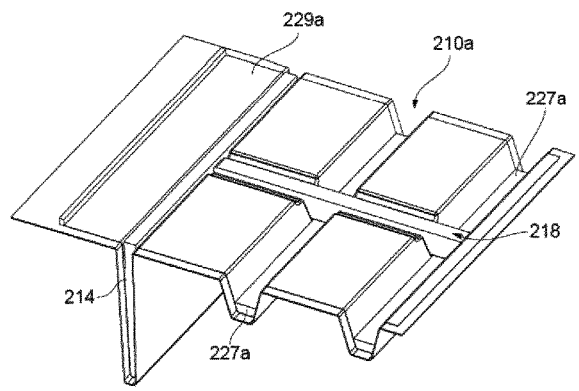
FIG. 24 shows a rib foot beam, spar core and batten preforms laid onto the fibre preform.

Next the male forming tool 200 is removed, batten preforms 227a shown in FIG. 24 are laid inside the stiffener preforms 210a, and then the rib foot beam 218 is laid inside the rib foot preform 211a across the batten preforms 227a. The rib foot beam 218 is fitted as a single cured piece of laminated prepreg composite material, and is in contact with the fibrous reinforcement material of the batten preforms 227a at each intersection.

A spar core 214 is also fitted inside the spar preform 231a. The spar core 214 may be fitted as a single cured piece of laminated prepreg composite material, and made of a dry carbon fibrous reinforcement material, including continuous fibres running along the length of the spar core 214.

Figure 25:
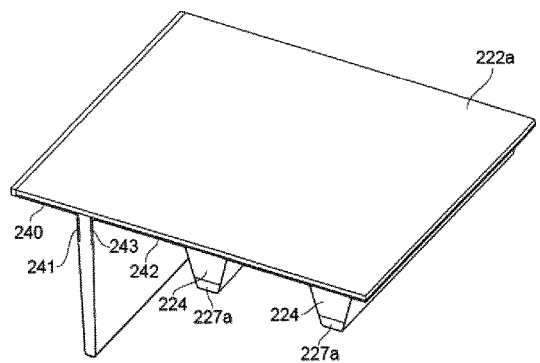
FIG. 25 shows form cores, additional material and a cover panel laid onto the assembly of FIG. 24.

Next the foam core segments 224 are laid on top of the batten preforms 227a as shown in FIG. 25, and additional dry fibre material inserted to fill the gaps. This additional dry fibre material includes noodles (not shown), a first fibre preform sheet 240 with a flange 241 fitted into a gap on one side of the spar core 214, and a second fibre preform sheet 242 with a flange 243 fitted into a gap on the other side of the spar core 214.

Next a panel preform 222a is laid on top as shown in FIG. 25, in contact with the fibre preform sheets 240, 242 and the spar core 214. The assembly is then inverted and placed on an infusion tool 202 shown in FIG. 26. The female compaction tool 201 is then removed and replaced by a vacuum bag (not shown) and the panel assembly is infused using the same process as previously described to produce the panel assembly shown in FIG. 26 on the infusion tool 202. The resin co-infuses the dry fibre components of the assembly (the fibre preform 229a, the batten preforms 227a, the panel preform 222a and the additional material including the preform sheets 240, 242) and is then cured to form the final panel assembly shown in FIG. 26.

In FIG. 17 the panel preform 22a is laid in direct contact with the fibre preform 29a and the rib foot beam 18 so the panel preform 22a becomes directly bonded to the fibre preform 29a and the rib foot beam 18 by the resin matrix material. In the case of FIG. 25, the additional dry fibre material 240, 242 has been laid over the fibre preform 229a and the rib foot beam 218 before the panel preform 222a is laid over them. So in this case the panel preform 222a is not in direct contact with the fibre preform 229a or the rib foot beam 218.

Figure 26:
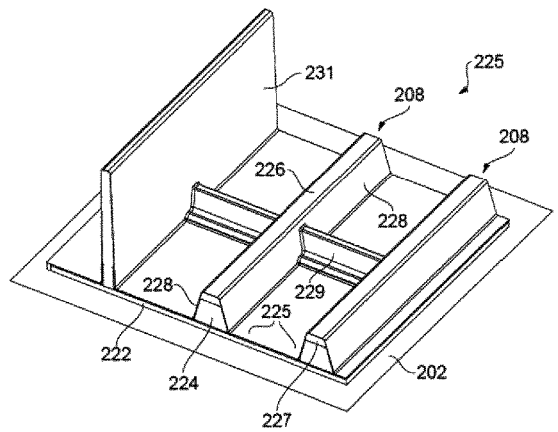
FIG. 26 shows the final preform assembly on an infusion tool.

The panel assembly of FIG. 26 includes a cover 222; and a spar 231 and stiffeners 208 which are carried on the inner surface of the cover 222. Each stiffener 208 comprises a pair of feet 225; a pair of webs 228; and a crown 226, all formed from a single layer 229 which also covers the rib foot beam between the stiffeners. Each stiffener also has a foam core 224 and a batten 227.

Figure 27:
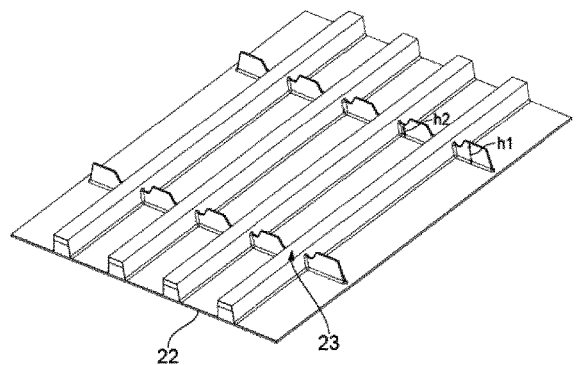
FIG. 27 shows an alternative panel assembly.

FIG. 27 shows an alternative panel assembly which is similar to the assembly of FIG. 4, and the same reference numbers are used to indicate equivalent components. The rib foot beam has a height perpendicular to the cover panel which is smaller at the intersections 23 (height h2) than between the intersections (height h1). The reduced height h2 at the intersections 23 reduces the size of the slot or other opening which is formed in the stiffener to enable the rib foot beam to pass through. The increased height h1 of the rib feet between the intersections provides more surface area to accommodate bolts or other fasteners.

FIGS. 28-37 relate to example stiffened panel assemblies, which are suitable to be comprised in the wing box of FIGS. 2 and 3. Some of the exampled stiffened panel assemblies described below may be comprised in any of the example panel assemblies described above.

Figure 28:
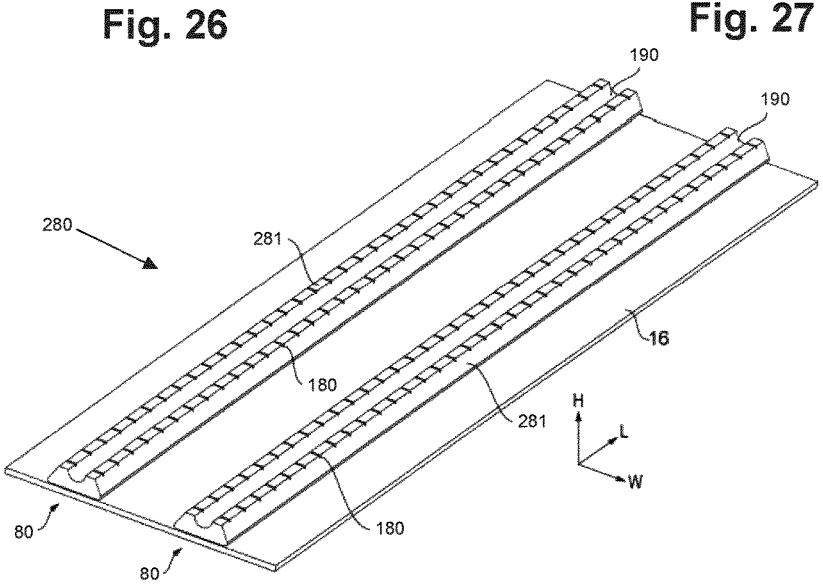
FIG. 28 shows a pair of foam core parts on a panel.
Figure 29:
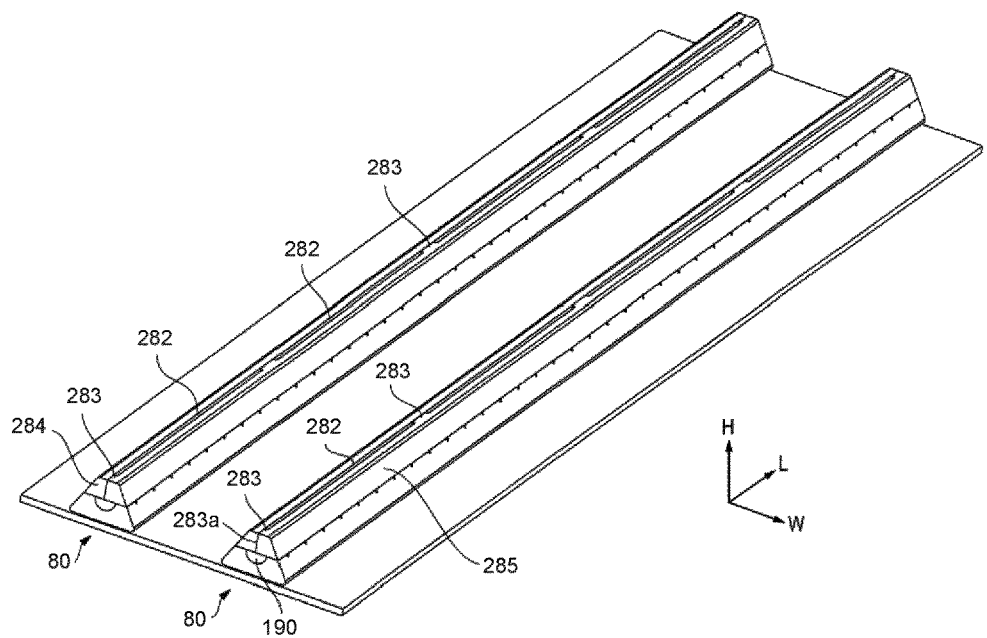
FIG. 29 shows a pair of battens laid onto each of the foam core parts.

FIG. 28 shows part of a stiffened panel assembly 280 which forms part of the upper or lower cover of one of the wings 2, 3. The panel assembly 280 comprises stiffeners 80 carried on a panel 16.

Figure 32:
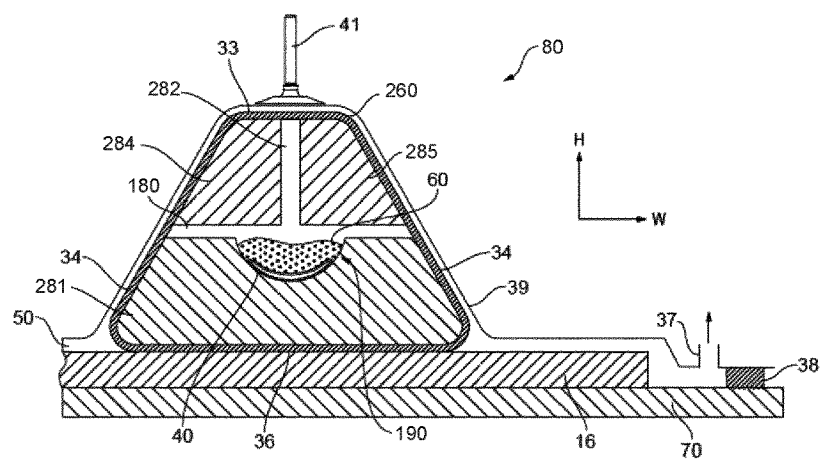
FIG. 32 is a cross-section across one of the stiffeners taken along line A-A in FIG. 31 at an initial stage of the infusion process.

As shown in FIG. 32, each stiffener 80 comprises a structural part 260, and a core 281, 284, 285 in the structural part 260. The structural part 260 comprises a layer of fibre-reinforced composite material such as carbon fibre reinforced polymer (CFRP). The structural part 260 is formed into a trapezoidal shape in cross section that includes a foot 36, a pair of webs 34, and a crown 33. The core includes a foam core part 281 made of a filler material such as foam, and a pair of battens 284, 285 made of a fibre-reinforced composite material such as carbon fibre reinforced polymer (CFRP). The filler material has a lower density than the fibre-reinforced composite material of the battens 284, 285.

The foot 36 is bonded to the inner surface of the panel 16 by a co-infused joint. The crown 33 and the battens 284, 285 are spaced away from the neutral bending axis of the panel assembly at the apex of the stiffener 80 to enhance its bending stiffness.

Figure 30:
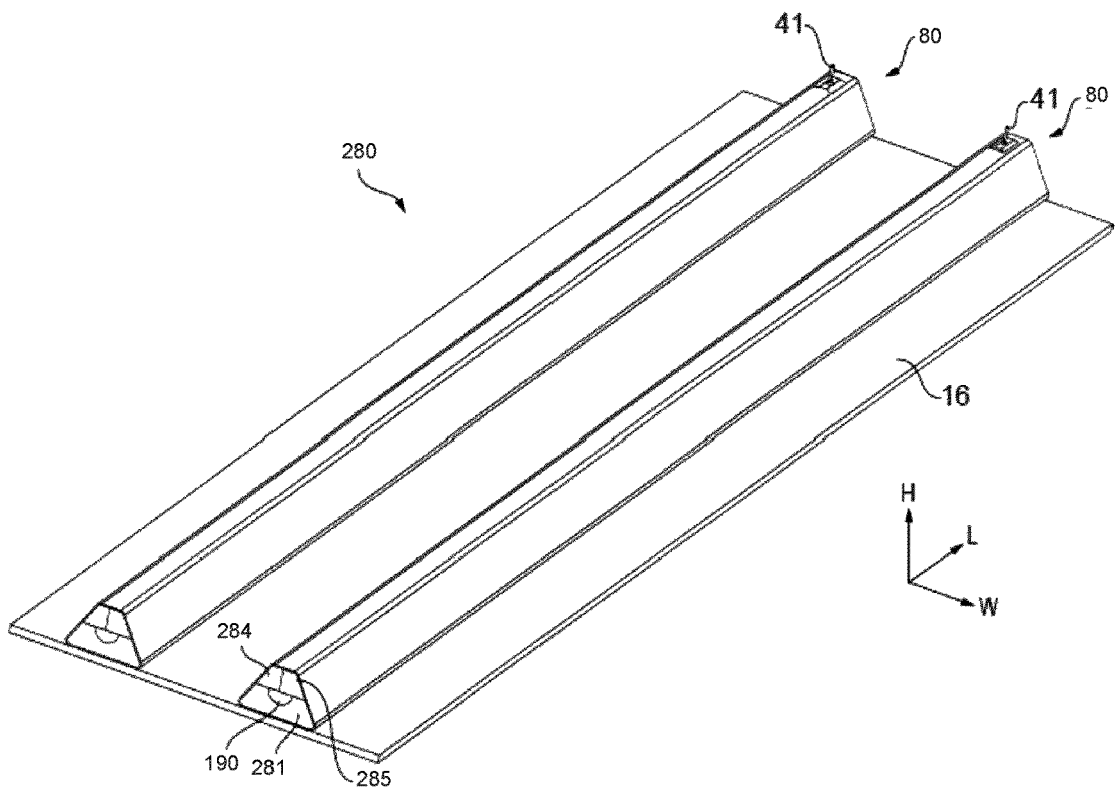
FIG. 30 shows a panel assembly comprises a pair of stiffeners on a panel, and also showing the positions of the resin inlet ports.
Figure 31:
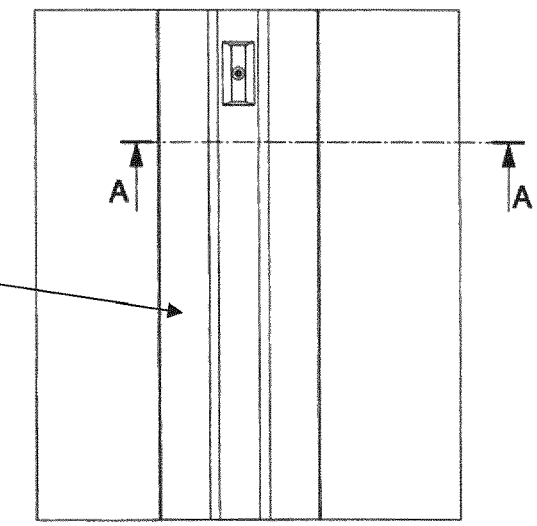
FIG. 31 is a plan view of part of the assembly of FIG. 30.

As shown in FIGS. 28 and 30, the foam core part 281 and the stiffener 80 each have a length in a length direction L, a width in a width direction W (transverse to the length direction L) and a height in a height direction H (transverse to the length direction L). As shown in FIG. 28, the foam core part 281 has a longitudinal channel 190 which extends in the length direction L along the full length of the foam core part 281. The longitudinal channel 190 is a groove in the upper face of the foam core part 281 with a semi-circular shape in cross-section.

The foam core part 281 also has branch channels 180 which extend in the width direction W from the longitudinal channel 190, and are spaced apart at regular intervals along the longitudinal channel 190. These branch channels 180 are grooves in the upper face of the foam core part 281, in fluid communication with the longitudinal channel 190.

The battens 240, 250 contact the crown 33 at the apex of the stiffener and are positioned between the webs 34. As seen most clearly in FIG. 29, one of the battens 285 has tabs 283 which are spaced apart along the length of the batten 285 and contact the side of the other batten 284 at an interface 283a.

Between the tabs 283, the battens 284, 285 are spaced apart to form slots 282. As shown in FIG. 32, each slot 282 extends in the height direction H from the longitudinal channel 190 to the structural part 260 of the stiffener. As shown in FIG. 4 each slot 282 also has a length which extends in the length direction L between the tabs 283, and a width which extends in the width direction W.

The structural layer 260 may be formed as a single tubular part by braiding carbon fibre over the core parts 281, 284, 285. Alternatively the structural layer 260 may be formed into its trapezoidal shape by wrapping dry-fibre fabric round the core parts 281, 284, 285 and then joining together the butting edges to form a butt-joint. In this example the structural layer 260 has a trapezoidal shape with a single foot 36 bonded to the panel 16, but in an alternative embodiment the structural layer 260 may have an omega shape or a top-hat shape with a pair of outward-facing feet which are bonded to the panel 160.

Figure 33:
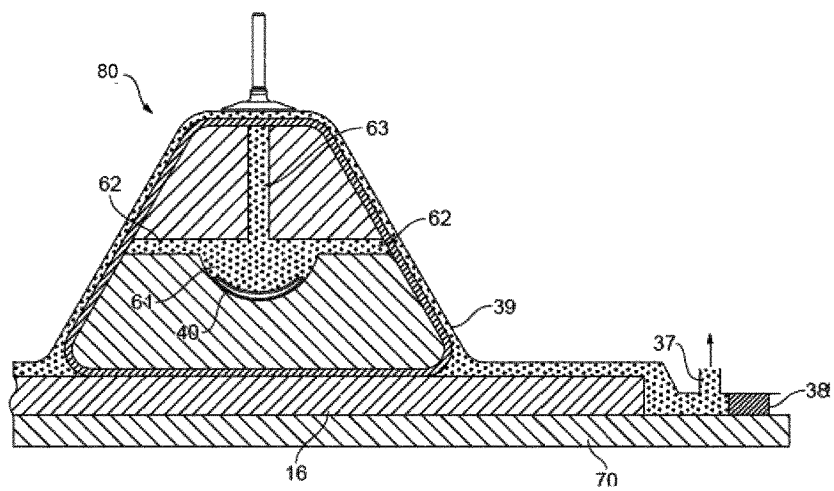
FIG. 33 shows a later stage in the infusion process after the panel assembly has been fully infused.
Figure 34:
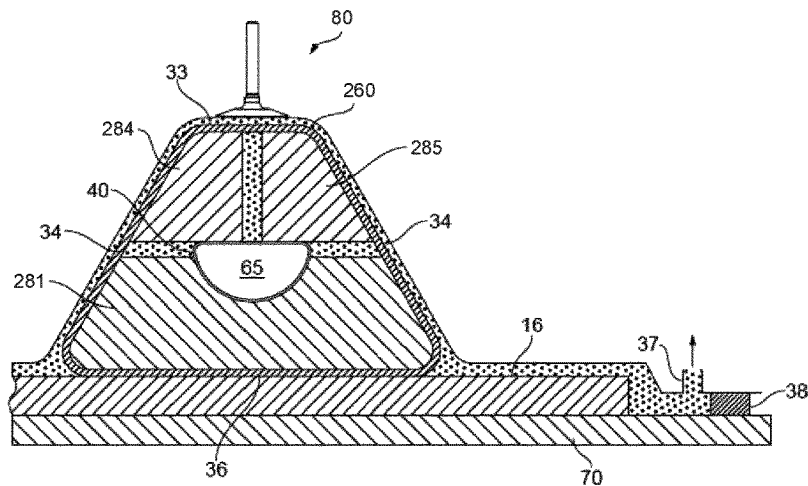
FIG. 34 shows the panel assembly after the bladder has been inflated.

The panel assembly 280 is laid up predominantly as dry-fibre, then infused with resin (a matrix material) by the process shown in FIGS. 32-34. During the infusion process the panel 16 is carried on an infusion tool 70.

A flexible bladder 40 is laid into the longitudinal channel 190 in a deflated state as shown in FIG. 32, before the battens 284, 285 are laid on top of the foam core part 281. A flexible vacuum bag 39 is laid over the panel assembly 28 and sealed to the infusion tool 70 by a seal 38 to form a vacuum chamber 50 between the vacuum bag 39 and the infusion tool 70. A vacuum is applied to the vacuum chamber via a vacuum port 37 as epoxy resin is injected via inlet ports 41 at the end of each stiffener 80. During the injection of resin the vacuum continues to be applied to the vacuum chamber 50 which draws the resin along the longitudinal channel 190, into the structural part 260 and into the panel 16.

Initially the vacuum draws the resin along the longitudinal channel 190 of each stiffener. FIG. 32 shows a stage in the infusion process when the longitudinal channel 190 has been partially filled with resin 60.

As the infusion process continues, the resin fills the longitudinal channel 190 and then overflows from the longitudinal channel 190 into the porous dry-fibre structural layer 260 via the branch channels 180 and the slots 282. The resin also flows into the porous dry-fibre panel 16. Once the vacuum chamber 50 is filled with resin, it overflows out of the vacuum port 37. At the end of the infusion process as shown in FIG. 33, a first portion of the resin (including the resin 60 shown in FIG. 32) has flowed along the longitudinal channel 190 and then flowed from the longitudinal channel 190 into the structural part 260 and into the panel 16. A second portion 61 of the resin remains in the longitudinal channel 190 as shown in FIG. 33 in contact with the bladder 40. A third portion 62 of the resin fills the branch channels 180 and a fourth portion 63 fills the slots 282.

The purpose of the channel 190 is to aid in the infusion process and reduce the requirement to have external resin flow channels in the infusion tool 70.

The bladder 40 is then inflated with air as shown in FIG. 34. Alternatively the bladder 40 may be inflated with a liquid, or a gas other than air. This inflation of the bladder pushes the second portion 61 of resin into the branch channels 180 and/or into the slots 282, which in turn pushes the third and fourth portions 62, 63 of resin out of the branch channels 180 and the slots 282 into the structural part 260. As the bladder 40 inflates, more resin overflows from the vacuum port 37 as shown in FIG. 34.

Once the bladder 40 has been fully inflated as in FIG. 34, the panel assembly is fully impregnated with resin and the bladder 40 is full of air 65. The bladder 40 is not removed, but there is an overall weight saving because the weight of the bladder 40 is less than the weight of the second portion 61 of the resin which it has displaced from the longitudinal channel 190.

The panel assembly is then heated to cure the epoxy resin so that the stiffeners become bonded to the panel 16. The cured epoxy resin forms co-infused joints between the feet 36 of the stiffeners and the panel 16; and co-bonded joints between the structural part 286 and the core parts 281, 284, 285 of each stiffener.

Figure 35:
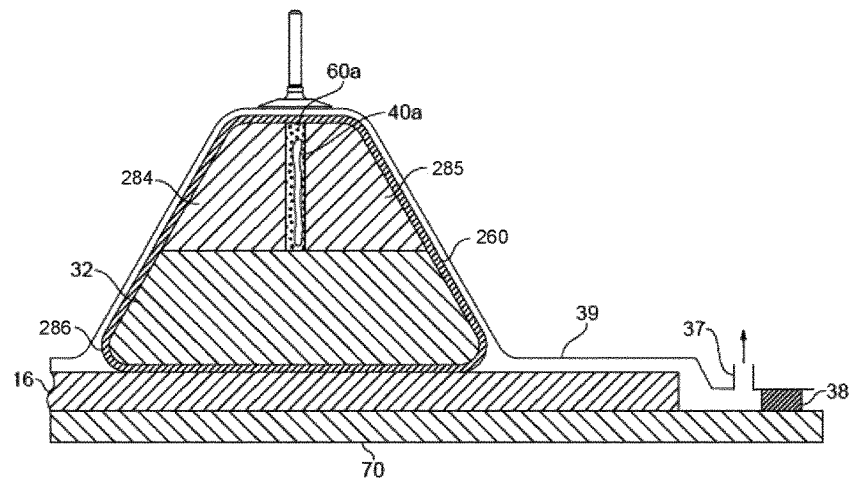
FIG. 35 is a cross-section across an alternative panel assembly at an initial stage of the infusion process.
Figure 36:
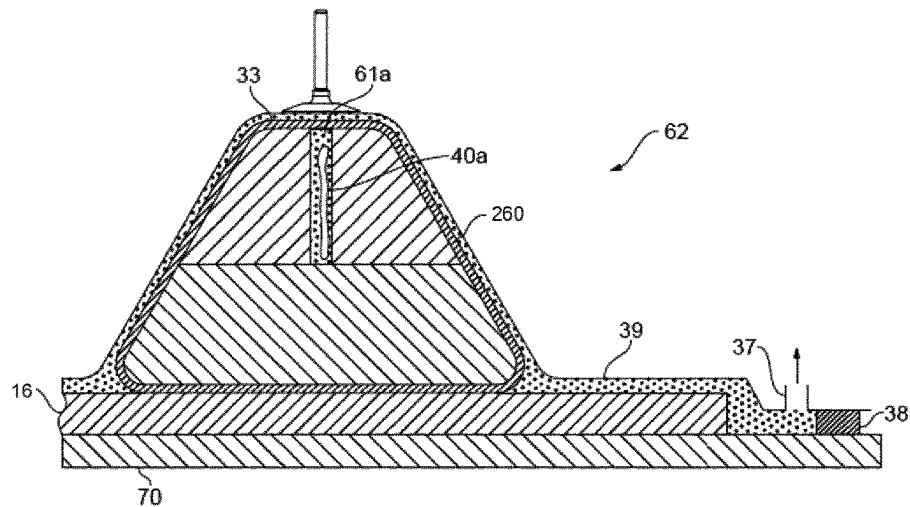
FIG. 36 shows a later stage in the infusion process after the panel assembly has been fully infused.
Figure 37:
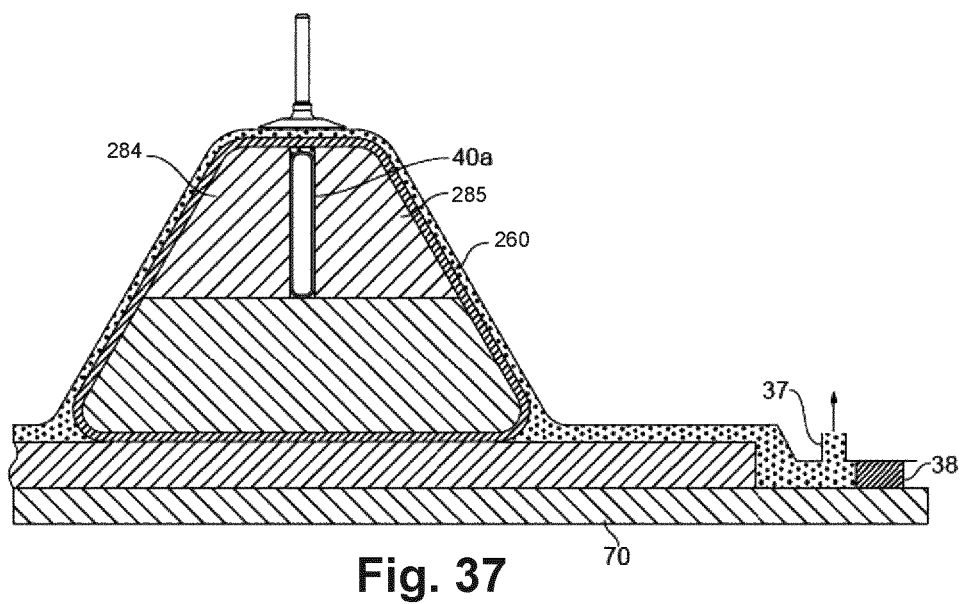
FIG. 37 shows the panel assembly after the bladder has been inflated.

An alternative embodiment of the stiffened panel assembly is shown in FIGS. 35-37. The panel assembly of FIGS. 35-37 is similar to the panel assembly shown in FIGS. 28-34 and the same reference numbers will be used to indicate equivalent components. In this embodiment, the foam core part 281 is replaced by a foam core part 32 with no channels. In FIGS. 28-34 there are multiple slots 282 separated by tabs 283, but in the case of FIGS. 35-37 there are no tabs 283 so a single slot runs continuously along the full length of the stiffener between the battens 284, 285 and contains a bladder 40*a* shown in FIG. 35 in its deflated state.

FIG. 35 shows a stage in the infusion process when the slot has been filled with resin 60*a*. As the infusion process continues, the resin overflows from the slot into the porous dry-fibre structural layer 286. The resin also flows into the porous dry-fibre panel 16. Once the vacuum chamber is filled with resin, it overflows out of the vacuum port 37. At the end of the infusion process as shown in FIG. 36, a first portion of the resin (including the resin 60*a* shown in FIG. 35) has flowed along the slot and then flowed from the slot into the structural part 286 and into the panel 16. A second portion 61*a* of the resin remains in the slot as shown in FIG. 36 in contact with the bladder 40*a*.

The bladder 40*a* is then inflated with air as shown in FIG. 37. This inflation of the bladder pushes the second portion 61*a* of resin out of the slot and into the structural part 286. As the bladder 40*a* inflates, more resin overflows from the vacuum port 37 as shown in FIG. 37.

Once the bladder 40*a* has been fully inflated as in FIG. 37, the panel assembly is fully saturated with resin and the bladder 40*a* is full of air. The panel assembly is then heated to cure the epoxy resin so that the stiffeners become bonded to the panel 16.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

Numbered Clauses

1. A stiffened panel assembly comprising:
   a panel; and
   a stiffener on the panel, the stiffener comprising: a structural part, a core in the structural part, a longitudinal channel in the core which extends in a length direction of the core, and a bladder in the longitudinal channel.
2. A stiffened panel assembly according to clause 1 wherein the structural part comprises one or more feet bonded to the panel.
3. A stiffened panel assembly according to any preceding clause wherein the core comprises a core material, the structural part comprises a structural material, and the core material has a lower density than the structural material.
4. A stiffened panel assembly according to any preceding clause wherein the panel and the structural part each comprise a fibrous material co-infused with a matrix material which bonds the panel to the structural part.
5. A stiffened panel assembly according to any preceding clause wherein the structural part comprises a crown and a pair of webs, and the core is positioned between the webs.
6. A stiffened panel assembly according to any preceding clause wherein the structural part comprises a fibrous material.
7. A stiffened panel assembly according to any preceding clause wherein the core comprises a first core part made of a first core material and a second core part made of a second core material different to the first core material; and the longitudinal channel and the bladder are in the first core part.
8. A stiffened panel assembly according to clause 7 wherein the longitudinal channel comprises a groove in the first core part.
9. A stiffened panel assembly according to any preceding clause wherein the core comprises a first core part made of a filler material, and a pair of structural core parts made of a fibre-reinforced composite material; and the bladder is between the pair of structural core parts.
10. A stiffened panel assembly according to any preceding clause further comprising a slot in the core which extends in a transverse direction from the longitudinal channel to the structural part of the stiffener, wherein the slot has a length which extends in the length direction of the core and a width which extends in the transverse direction.
11. A stiffened panel assembly according to any preceding clause further comprising branch channels which branch out from the longitudinal channel at a series of points along a length of the longitudinal channel, wherein each branch channel extends in a transverse direction from the longitudinal channel to the structural part of the stiffener.
12. A stiffened panel assembly according to clause 11 wherein the structural part comprises a crown and a pair of webs, the core is positioned between the webs, and each branch channel extends from the longitudinal channel to one of the webs.
13. An aircraft or aircraft part comprising a stiffened panel assembly according to any preceding clause.
14. A method of manufacturing a stiffened panel assembly according to clause 1, the method comprising:
   injecting matrix material into the longitudinal channel so that a first portion of the matrix material flows along the longitudinal channel and then flows from the longitudinal channel into the structural part and into the panel, and a second portion of the matrix material remains in the longitudinal channel and in contact with the bladder;
   inflating the bladder so that the bladder forces at least some of the second portion of the matrix material to flow out of the longitudinal channel; and
   curing the matrix material so that the stiffener becomes bonded to the panel.
15. A method according to clause 14 wherein inflating the bladder causes at least some of the matrix material to flow into the structural part or into the panel.
16. A method according to clause 14 or 15 wherein the structural part comprises a crown and a pair of webs, the core is positioned between the webs, and during the injection of the matrix material at least part of the first portion of the matrix material flows along the longitudinal channel and then into the crown and webs of the structural part.

17. A method according to clause 14, 15 or 16 wherein the structural part comprises a foot in contact with the panel, during the injection of the matrix material at least part of the first portion of the matrix material flows along the longitudinal channel and then into the foot of the stiffener, and the foot of the stiffener becomes bonded to the panel during the curing step.

18. A method according to any of clauses 14 to 17 wherein the panel assembly further comprises branch channels which branch out from the longitudinal channel at a series of points along a length of the longitudinal channel, and during the injection of matrix material at least part of the first portion of the matrix material flows along the longitudinal channel and then flows from the longitudinal channel into the structural part via the branch channels.

19. A method according to any of clauses 14 to 18 wherein the panel assembly further comprises a slot in the core, the slot has a length which extends in a length direction of the core and a width which extends in a transverse direction from the longitudinal channel to the structural part of the stiffener, and the bladder forces at least some of the second portion of the matrix material to flow out of the longitudinal channel into the slot.

20. A method according to any of clauses 14 to 19 further comprising fitting a flexible vacuum bag over the stiffened panel assembly to form a vacuum chamber, and during the injection of the matrix material applying a vacuum to the vacuum chamber which draws the matrix material along the longitudinal channel, into the structural part and into the panel.

The invention claimed is:
1. An aircraft wing, comprising:
an upper wing cover assembly;
a lower wing cover assembly; and
a rib connecting the upper wing cover assembly to the lower wing cover assembly;
wherein at least one of the wing cover assemblies comprises:
a panel; and
a plurality of stiffeners on the panel,
wherein each stiffener comprises an attachment part attached to the panel and a structural part spaced apart from the panel, the structural part comprising a batten, wherein the structural part of each stiffener comprises a crown which joins a pair of webs to each other; and
a rib foot beam which crosses the stiffeners at a series of intersections,
wherein at each intersection the rib foot beam is located between the panel and the structural part of a respective one of the stiffeners,
wherein the rib foot beam is attached to the rib between the intersections,
wherein the rib foot beam is directly bonded to the batten, and
wherein the batten is positioned between the webs and in contact with the crown at an apex of the stiffener.

2. The aircraft wing according to claim 1 wherein the attachment part of each stiffener is bonded to the panel.

3. The aircraft wing according to claim 1 wherein the rib foot beam is bonded to the panel.

4. The aircraft wing according to claim 1 wherein the rib foot beam is bonded to the stiffeners at the intersections.

5. The aircraft wing according to claim 1 wherein at each intersection the structural part of the respective one of the stiffeners extends continuously across the intersection.

6. The aircraft wing according to claim 1 wherein at each intersection the structural part of the respective one of the stiffeners comprises reinforcement fibres which extend continuously across the intersection.

7. The aircraft wing according to claim 1 further comprising a layer which forms the structural parts of all of the stiffeners and covers the rib foot beam between the stiffeners.

8. The aircraft wing according to claim 1 wherein the stiffeners are bonded to an inner surface of the panel, and the panel has an outer surface with a curved aerodynamic profile.

9. The aircraft wing according to claim 1 wherein the attachment part of each stiffener comprises a pair of feet and the pair of webs.

10. The aircraft wing according to claim 1 wherein the attachment part of each stiffener comprises a pair of feet and a pair of webs; and the structural part of each stiffener comprises a crown which joins the pair of webs to each other and a reinforcement element between the webs.

11. The aircraft wing according to claim 1, wherein the plurality of stiffeners comprises cut fibers.

12. The aircraft wing according to claim 1, wherein each stiffener further comprises a core, the core comprises a core material, the structural part comprises a structural material, and the core material has a lower density than the structural material.

13. The aircraft wing according to claim 1, wherein each stiffener further comprises a foam core.

14. The aircraft wing according to claim 1, wherein each stiffener further comprises a core formed in segments, and at each intersection the rib foot beam passes through a gap between adjacent segments of the core.

* * * * *